J. F. MERRELL.
PUSH-OFF ATTACHMENT FOR SWEEP RAKES.
APPLICATION FILED SEPT. 9, 1908.
932,881.
Patented Aug. 31, 1909.
2 SHEETS—SHEET 2.
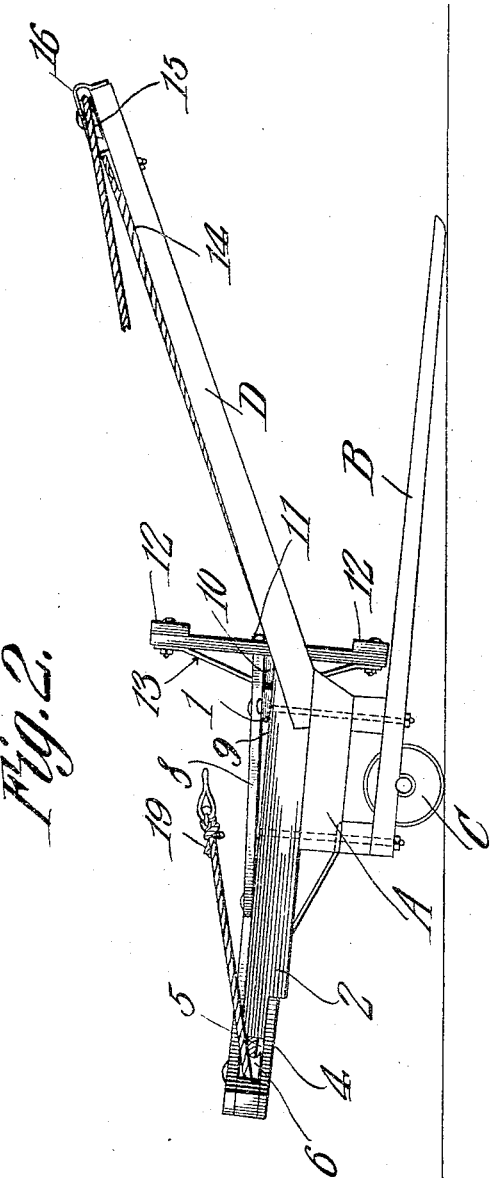
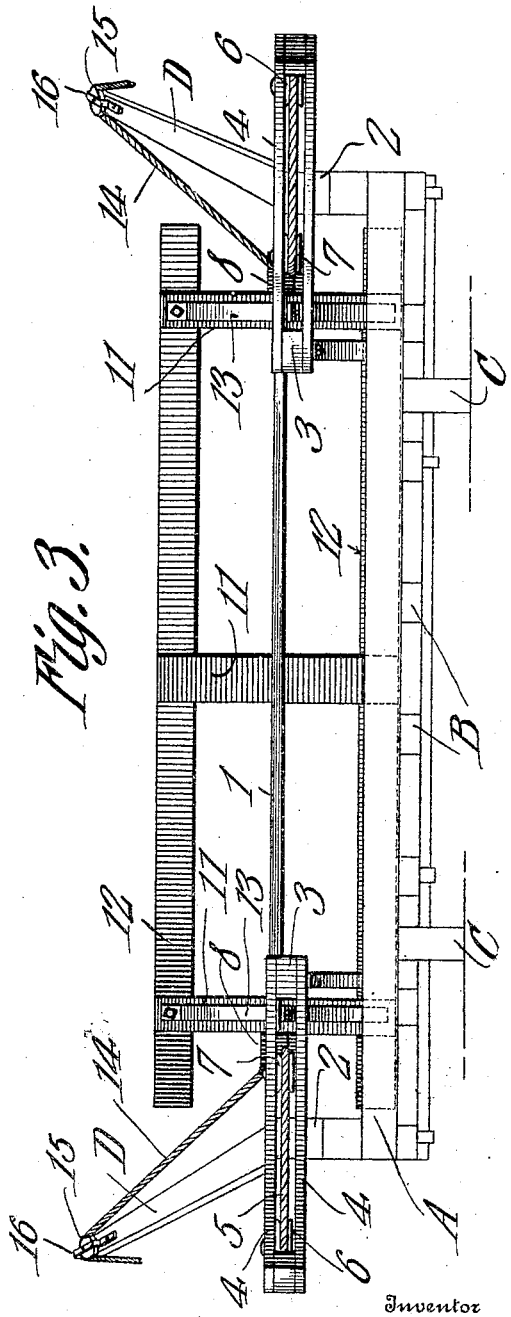
Witnesses
Inventor
John F. Merrell.
By C. A. Snow & Co.
Attorneys

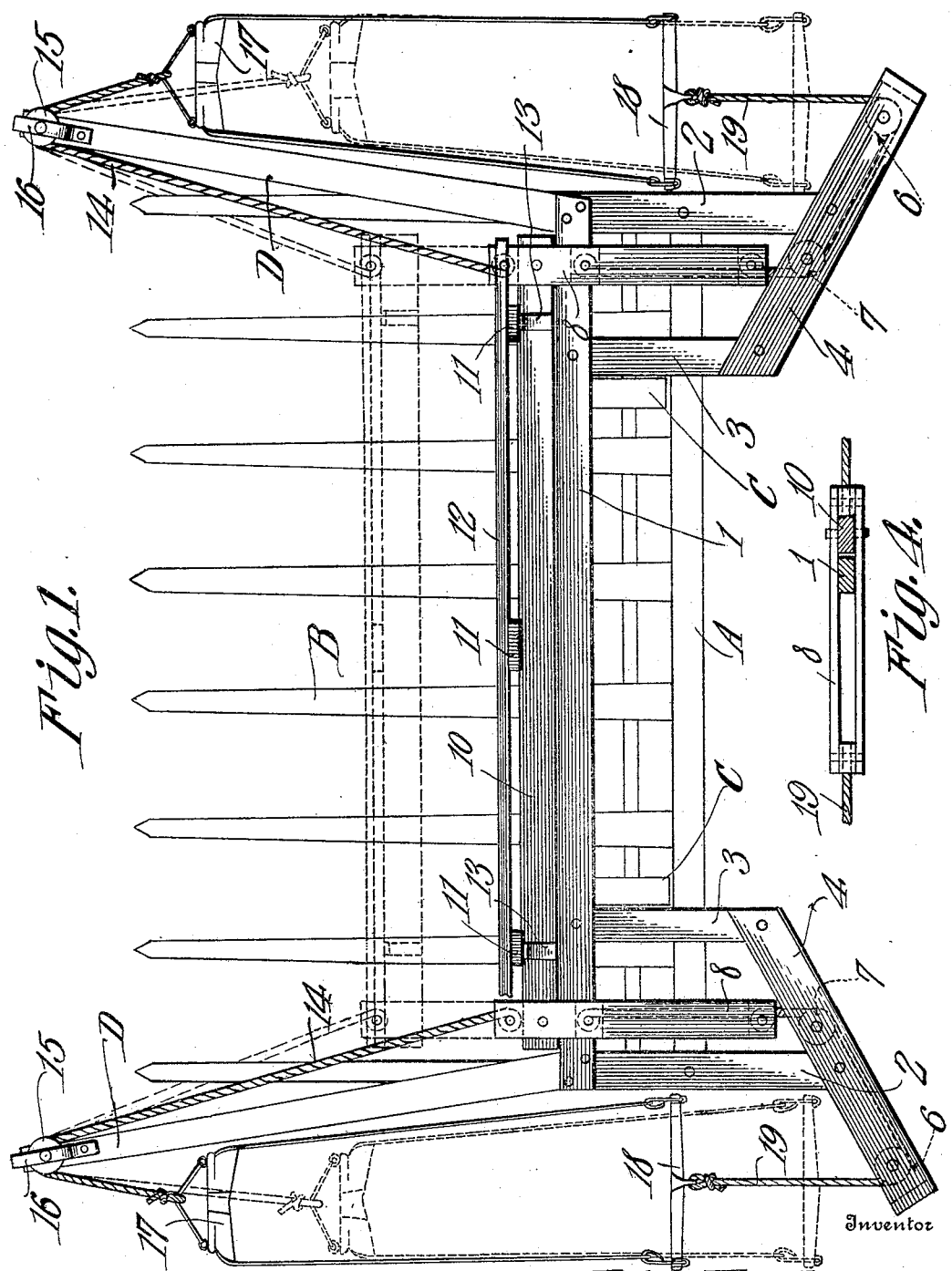

UNITED STATES PATENT OFFICE.

JOHN F. MERRELL, OF NEWTON, KANSAS.

PUSH-OFF ATTACHMENT FOR SWEEP-RAKES.

932,881. Specification of Letters Patent. Patented Aug. 31, 1909.

Application filed September 9, 1908. Serial No. 452,184.

*To all whom it may concern:*

Be it known that I, JOHN F. MERRELL, a citizen of the United States, residing at Newton, in the county of Harvey and State of Kansas, have invented a new and useful Push-Off Attachment for Sweep-Rakes, of which the following is a specification.

This invention relates to attachments for sweep rakes, and more particularly to means whereby the load can be readily pushed off of the rake while the same is being withdrawn from the load.

A further object is to provide a push-off attachment designed to be operated by the draft animals while being backed during the withdrawal of the rake from the load.

Another object is to provide an attachment of this character which can be readily applied to sweep rakes of various constructions.

A still further object is to provide a push-off attachment which is of simple and durable construction, and which can be manufactured at comparatively slight cost.

With these and other objects in view, the invention consists of certain novel features of construction and combinations of parts, which will be hereinafter more fully described, and pointed out in the claims.

In the accompanying drawings the preferred form of the invention has been shown.

In said drawings:—Figure 1 is a plan view of a sweep rake having the attachments constituting the present invention applied thereto. Fig. 2 is a side elevation of the parts shown in Fig. 1. Fig. 3 is a rear elevation thereof. Fig. 4 is a side elevation of one of the slides and showing the guide bar and the longitudinal bar of the head in section.

Referring to the figures by characters of reference, "A" designates the head of the sweep rake, said head having tines "B" extending forwardly therefrom and designed to travel upon or close to the ground, there being suitable supporting wheels "C" for holding the head of the rake out of contact with the ground. Tongues "D" extend upwardly and forwardly from the end portions of the head.

The attachment constituting the present invention consists of a fixed guide or crossbar 1, bolted or otherwise secured to sidearms 2, extending rearwardly therefrom and preferably parallel, said side arms being bolted or otherwise detachably fastened to the side portions of the head "A" of the sweep rake. Intermediate arms 3 also extend rearwardly from the guide or crossbar 1 at points between but adjacent the arms 2, said intermediate arms being preferably shorter than the arms 2, and having arms 4 secured to their rear ends and extending rearwardly and outwardly therefrom. Each arm 4 is provided with a transverse slot 5, extending practically throughout the length of the arm, there being a grooved wheel or sheave fixed within the outer end portion of the slot 5, and another grooved wheel or sheave 7 within that portion of the slot disposed between the arms 2 and 3.

Mounted upon each end portion of the bar 1, and between the arms 2 and 3, is a transversely slotted slide 8, the slot 9, within said slide extending from end to end thereof, and the bar 1 being located therein. The slides 8 are pivotally connected to the end portions of a bar 10, arranged longitudinally along the middle portion of the head of the push-off attachment. Strips 11 are secured upon the bar 10 and perpendicularly thereto, and the end portions of the strips are connected by means of upper and lower slats 12. These strips and slats and the bar 10 coöperate to form a head. Braces 13 connect the end portions of the bar 10 with the upper and lower portions of the adjoining strips 11. These braces hold the slats 12 and strips 11 in fixed relation to the bar 10. The lower slat 12 is designed to slide upon the upper faces of the tines.

Cables 14 are secured to the front end portions of the slides 8, and extend forward and partly around the grooved wheels 15, which are journaled in brackets 16, secured to the forward ends of the tongues "D". The forward end of each cable is connected to the collar 17 of the harness of one of the draft animals. The swingletree 18, to which the draft animal is to be harnessed, is connected to one end of a cable 19, extending partly around the wheel 6, and thence longitudinally within the slot 5, and partly around the pulley 7, the inner end of said cable being attached to the rear end of the adjoining slide 8. It is of course to be understood that this arrangement of cables and harness is duplicated at the other end or side of the machine.

In using the attachment herein described the same is bolted or otherwise secured to the sweep rake as hereinbefore stated, and the draft animals are then harnessed to the swingle trees 18, and the cables 14 are fastened at their outer ends to the collars of the harness. When the draft animals are driven forward, they pull on the swingle-trees 18 so as to cause the cables 19 to draw backwardly on the push-off head of the attachment, said head being thus brought into position against the bar 1. As the rake moves forward the hay or other material to be gathered will accumulate thereon as ordinarily. When a sufficient load has been gathered, the same is conveyed to a stacking fork or any other point where it is desired to discharge the load, and, as soon as this point has been reached, the draft animals are backed. Before the sweep rake begins to move backward with the animals, the cables 14 will be drawn by the animals so as to pull the head of the push-off attachment forward upon the tines "B". The load will thus be pushed off of the tines, and, as soon as the head of the attachment reaches the limit of its forward movement, said movement being stopped by the rear end portions of the slides 8 coming into contact with the bar 1, the fork or rake will be moved backward from the load, and the entire load thus be deposited at a predetermined point.

It is to be understood that the attachment herein described can be readily secured to sweep rakes of various constructions, and is advantageous because it enables the operator to discharge the load at a predetermined point without danger of scattering it over a considerable area.

It is to be understood that the device can be very readily changed so as to be operated in the manner hereinbefore described by draft animals located in the rear thereof. Various other changes in the construction and arrangement of the parts and the proportions thereof can also be made without departing from the spirit or sacrificing any of the advantages of the invention.

What is claimed is:—

1. The combination with a sweep rake; of a push-off attachment comprising a head slidably mounted upon the tines of the rake, slides pivotally connected to and extending rearwardly from the head, a relatively fixed guide bar extending through the slides, guide sheaves disposed in front of and in rear of the head and fixed relative to the rake, and flexible, power-transmitting devices connected to the head and mounted upon the last mentioned sheaves for attachment to a draft animal.

2. The combination with a sweep rake having tongues; of a push-off attachment therefor comprising a guide bar, slides mounted thereon, a head pivotally connected to the slides and slidably mounted upon the rake, guide sheaves connected to the bar and to the tongues, and disposed back of and in front of the head respectively, and flexible, power-transmitting devices connected to the head and mounted upon the sheaves, and for attachment to draft animals.

3. The combination with a sweep rake having tongues; of a push-off attachment therefor comprising a guide bar fixedly secured upon the rake, guide sheaves connected to said bar and in rear of the rake, certain of said sheaves being disposed beyond the sides of said rake, guide sheaves upon the tongue, a head slidably mounted upon the rake, and flexible power-transmitting devices mounted upon the front and rear guide sheaves respectively and secured to the head, said devices being disposed to be attached to draft animals.

4. The combination with a sweep rake; of a push-off attachment comprising a guide bar fixedly secured upon the rake, arms connected to the bar and extending rearwardly and laterally from the rake, guide sheaves carried by the arms, a head slidably mounted upon the rake, guide sheaves supported in front of the head, and flexible power-transmitting devices carried by the respective guide sheaves and secured to the head, said devices being disposed to be attached to draft animals.

5. The combination with a sweep rake, of a push off attachment comprising a cross-bar detachably secured upon the rake, a head slidably mounted upon the tines of the rake and comprising a bar, strips thereon and perpendicular thereto, and slats connecting the strips, side and intermediate arms secured to and extending rearwardly from the cross-bar, laterally extending arms carried thereby, slides pivotally connected to the bar of the head and slidably mounted on the cross-bar, guide sheaves within the laterally extending arms, guide sheaves upon the rake and in front of the head, and flexible devices secured to the front and rear portions of the slides and mounted on the sheaves for attachment to a draft animal.

In testimony that I claim the foregoing as my own, I have hereto affixed my signature in the presence of two witnesses.

JOHN F. MERRELL.

Witnesses:
E. P. CHANDLER,
R. B. STEWART.